Feb. 20, 1962 R. T. BURNETT 3,021,923
BRAKE
Filed May 23, 1958 3 Sheets-Sheet 2
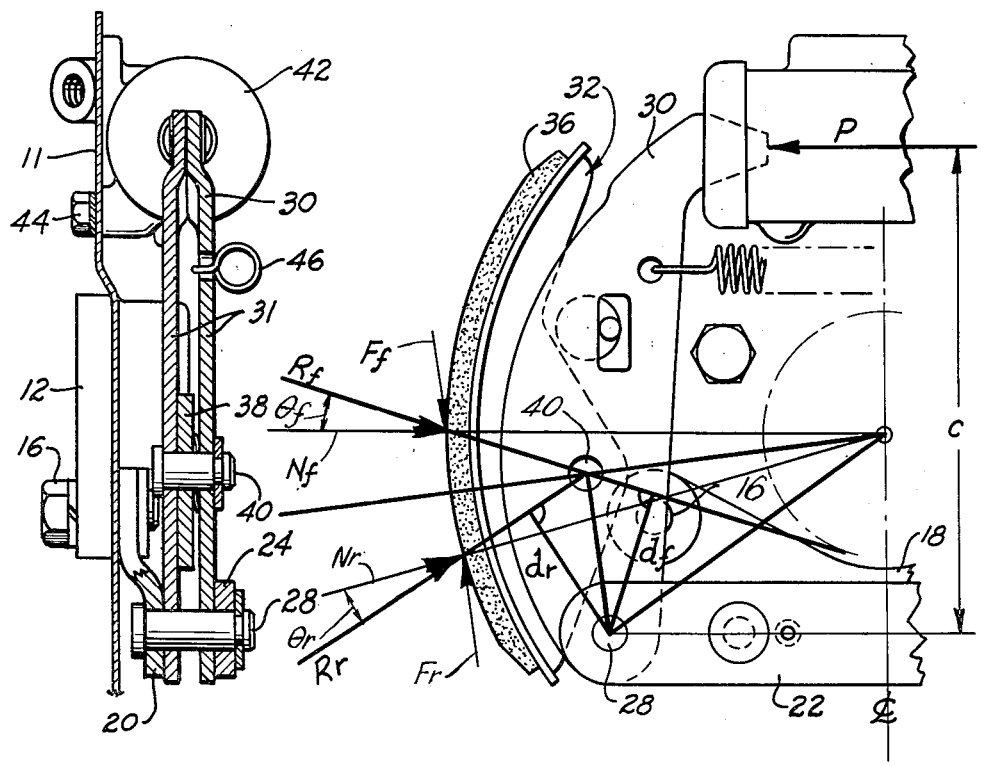
FIG_2  FIG_4
INVENTOR.
RICHARD T. BURNETT.
BY
ATTORNEY.

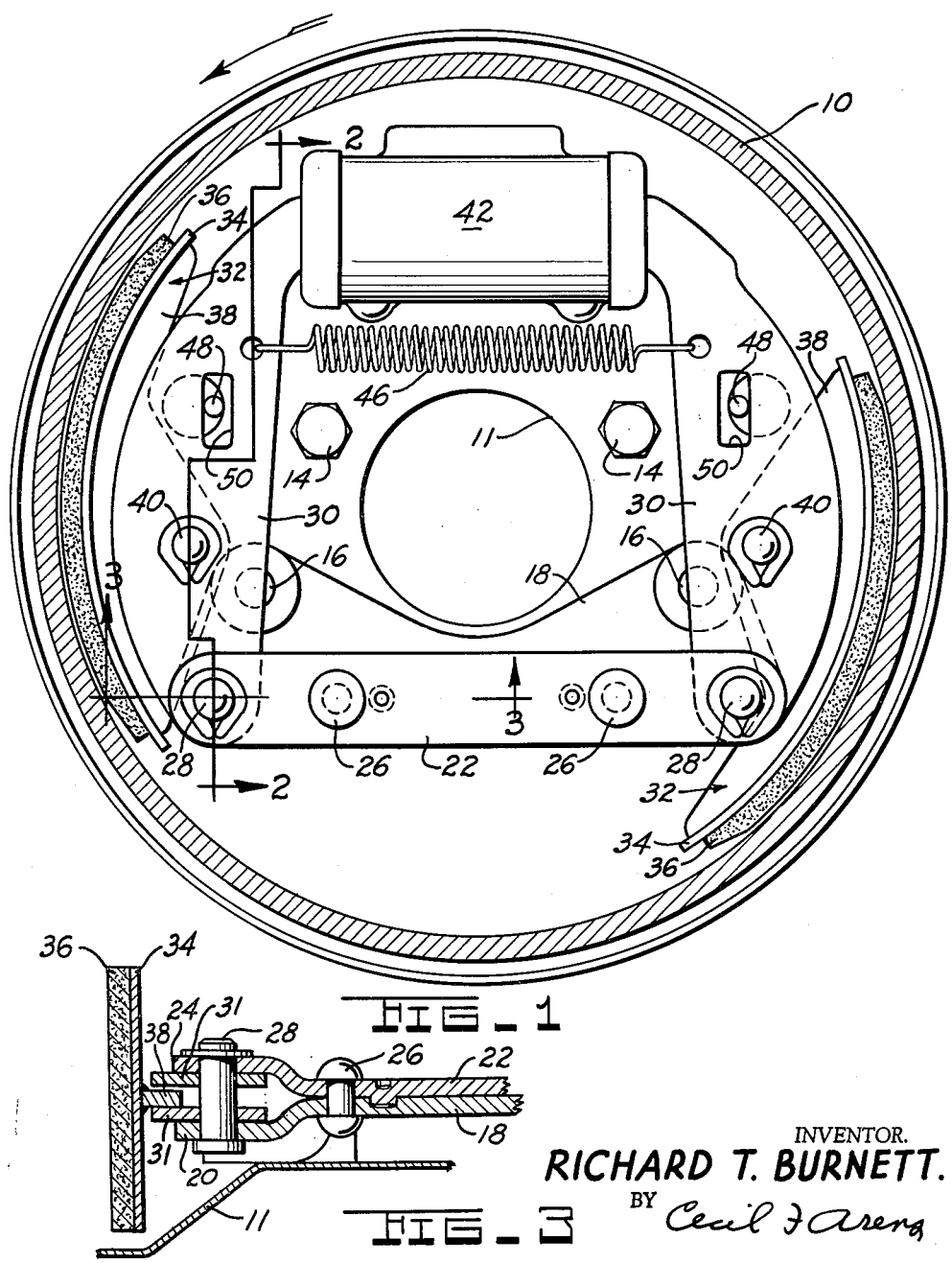

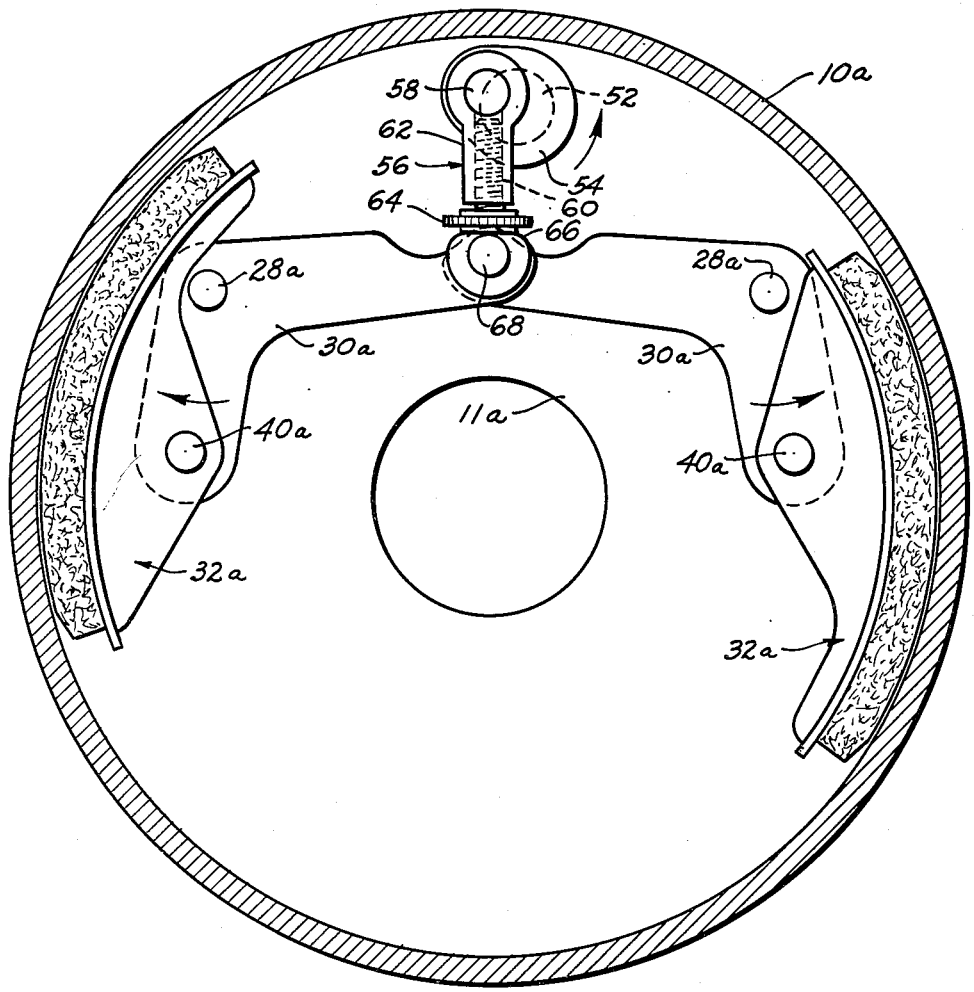
FIG_5

United States Patent Office 3,021,923
Patented Feb. 20, 1962

3,021,923
BRAKE
Richard T. Burnett, South Bend, Ind., assignor to The Bendix Corporation, a corporation of Delaware
Filed May 23, 1958, Ser. No. 737,259
8 Claims. (Cl. 188—78)

This invention relates to brakes and more particularly to brakes of the internally-expanding type in which a plurality of arcuate brake shoes are forced outwardly into engagement with the cylindrical surface of a brake drum.

Internally-expanding brakes are, of course, well known to those skilled in the art, there being literally thousands of various types which have been developed many having basically different operating and performance characteristics. In most of these shoe brakes, one of a pair of shoes is more effective than the other during braking in one direction, or the brake as a unit is more effective during braking in one direction, or both of these performance characteristics may be present. As a result, lining wear varies from shoe to shoe and brake to brake.

There are brakes known in the art in which each shoe theoretically has the same effectiveness as the other shoe during both forward and reverse braking. These brakes are generally of the energizing type and have the inherent characteristic of being somewhat unstable or erratic in their performance. One of the most undesirable results of this instability is that the effectiveness decreases or the brake "fades" during repeated applications or upon an application at high speeds. Also, their effectiveness varies widely with other operating conditions even during intermittent low speed brake applications. Moreover, many of these conventional brakes have the structural disadvantage of requiring actuating means between each pair of adjacent shoe ends.

It is, therefore, a primary object of my invention to provide a brake structure in which the effectiveness of each shoe will be the same during both forward and reverse braking and in which the effectiveness of one shoe is equal to the effectiveness of the other shoe regardless of the direction of braking, so that the wear rate of one brake shoe is equal to the wear rate of the other brake shoe.

It is a further object of my invention to provide a shoe brake which is exceptionally stable and, therefore, less subject than most conventional shoe brakes to loss of brake effectiveness or "fade" and other erratic performance characteristics resulting from heat phenomena.

Concurrently with the above objects it is another object of my invention to provide a shoe brake of the type discussed which requires a single actuating means and thus is structurally simple and relatively inexpensive to manufacture.

It is still another object of my invention to provide a brake structure whose basic design readily lends itself to various modifications thereby being adaptable for a wide range of installations including both light and heavy duty applications.

Other objects and advantages of my invention will become apparent from the following description which proceeds with reference to the accompanying drawings, in which:

FIGURE 1 is a side elevation of a brake assembly which incorporates the novel features of my invention;

FIGURES 2 and 3 are sectional views taken on lines 2—2 and 3—3, respectively, of FIGURE 1;

FIGURE 4 is a side elevation of a part of the brake assembly of FIGURE 1 and further illustrates the principles of my invention; and FIGURE 5 is a side elevation showing a brake assembly which embodies a modified version of my invention.

Referring to FIGURES 1, 2 and 3, the brake assembly is mounted within a rotatable drum 10 and includes a backing plate or support member 11 which is secured to a fixed part of the vehicle structure such as axle flange 12 by means of mounting bolts 14 and 16, the latter also serving a further function next described. At the lower end of the brake assembly there is secured to the support plate 11 by means of mounting bolts 16 a torque or anchor plate 18. Torque plate 18 has its lower portion bent axially outward, as best seen in FIGURE 3, with both of its ends 20, as shown in FIGURE 3, bent back toward the inboard side of the brake. Secured to torque plate 18 at its lower axially extended portion is a second torque plate 22 which has its ends 24 bent axially outward, as shown in FIGURE 3. The two torque plates 18 and 22 lie flush against one another at their center portions and are secured together by rivets 26. It will be noted from FIGURE 3 that the torque plates 18 and 22 and their end portions 20 and 24 form a bifurcated unitary torque member.

Received within each of the bifurcated ends of the torque plates 18 and 22 and pivotally connected thereto by pins 28 are lever members 30. Each of the lever members 30 is formed from two stamped plates 31 joined at their upper ends and spaced apart throughout the remaining length thereof.

Pivotally connected to each of the lever members 30 is an arcuate shoe 32 comprising an arcuate rim 34, a friction-material lining 36 secured thereto and a transverse strengthening web 38 joined to the arcuate rim 34. The web 38 is received between the spaced apart plates 31 of lever member 30 and is pivotally connected thereto by means of pins 40. The shoes 32 are oppositely located to obtain equal reaction on the wheel bearings and also to decrease drum distortion. The shoes 32 are nonsymmetrical about their own pivot point, the friction material being evenly distributed with respect to the resultant drum force on the shoe in forward braking to produce even wear from end to end of each shoe, substantially all of the wear occurring during forward braking. However, the shoes are so constructed as to be interchangeable from one side of the brake to the other.

Interposed between the upper ends of lever members 30 is a hydraulic wheel cylinder 42 of conventional construction which is secured to the support member 11 by means of mounting bolts 44 (FIGURE 2). To maintain the ends of lever members 30 in abutting contact with the ends of wheel cylinder 42, I provide a suitable return spring 46 which interconnects the two lever members 30.

Suitable means for varying the retracted position of the shoes 32 as the lining 36 wears may be provided if desired. In FIGURE 1, I have shown one such means which includes a pair of pins 48 eccentrically mounted on the support plate 11, each engaging a vertical slot 50 in the lever member 30. As the friction lining 36 wears, the eccentrics can be rotated to cam the levers 30 outwardly and thereby adjust the position of the shoes 32.

In operation, fluid pressure from an operator controlled source (not shown) is introduced into the hydraulic wheel cylinder 42 which by acting on the upper ends of levers 30 pivots levers 30 about pins 28. Through the pivotal connections 40 with the shoes 32 the levers 30 spread the shoes outwardly into engagement with the rotating drum 10. Assuming counterclockwise drum rotation, as indicated by the arrow in FIGURE 1, to be the direction of drum rotation during forward vehicle movement, all of the anchoring force or the reaction of the drum on each shoe will pass through pin 40 and be transmitted by lever 30 through pin 28 to the torque plates 18 and 22. The resultant of all the drum forces acting on each of the shoes 32 will have to pass through the pin 40 since this is the sole support for the shoe. Referring to FIG- URE 4, this resultant drum force during braking of forward vehicle movement is indicated by $R_f$. $R_f$ is the resultant of the normal force $N_f$ and the frictional force $F_f$. The angle formed at the intersection of $R_f$ with the normal force $N_f$ is $\theta_f$. Since it is known that R passes through point 40 and forms an angle $\theta_f$ with a radius at its intersection along the outer surface of the lining 36, the location of $R_f$ along the length of the liner segment 36, can be determined with these known parameters by the empirical process of drawing a number of reaction forces $R_f$ passing through point 40 and determining whether a radius which intersects with $R_f$ at the outer periphery 36 will form an angle equal to the coefficient of friction. The tangent of angle $\theta_f$ is equal to $$\frac{F_f}{N_f}$$

which is equal to the coefficient of friction.

In braking during a reverse direction of vehicle movement, or clockwise rotation of the drum, the resultant force $R_r$ will be inclined to a radial line representing the direction of normal force $N_r$ at an angle $\theta_r$ whose tangent also equals the coefficient of friction.

By taking the summation of moments about the pivot pin 28 for a given input P with a moment arm c, we see that $R_r$ equals $$\frac{P_c}{d_r}$$

and $R_f$ equals $$\frac{P_c}{d_f}$$

Therefore, if the moment arms $d_r$ and $d_f$ are equal, $R_r$ will equal $R_f$. In other words, if the actuating lever 30 is pivoted on a point equally distant from the line of action of the forward and reverse resultant drum forces, the effectiveness of each shoe will be the same during both forward and reverse braking and the two shoes will have equal effectiveness and equal lining wear. Thus, if the two pivot points 28 and 40 are located on a line that is perpendicular to the radial line passing through the pivot point 40, the moment arms $d_r$ and $d_f$ will be equal. This is the structure clearly shown in FIGURE 4 and obviously if the pivot points 28 and 40 on the right hand side of the brake are relatively located in the same manner the same results will be attained with reference to the right-hand brake shoe. Therefore, it is clear that I have developed a brake structure in which each shoe is equally effective, and for a given input will have the same effectiveness in both forward and reverse braking.

The specific embodiment of my invention shown in FIGURES 1–4 is the most satisfactory arrangement for use with a hydraulic system. In the next embodiment of my invention, shown in FIGURE 5, there is disclosed a basic structure which can be utilized with a pneumatic, mechanical or hydraulic system.

Referring now to FIGURE 5, parts similar to those shown in the embodiment of FIGURE 1 will receive the same reference numeral followed by the letter "a." The brake of FIGURE 5 comprises a nonrotatable backing or support plate 11a which has pivotally mounted thereon by means of pivot pins 28a a pair of bell-crank levers 30a. On one arm of each of the bell-crank levers 30a is pivotally mounted by means of pivot pins 40a a brake shoe 32a.

To apply the brake, I provide a shaft 52 which has one end received through the support member 11a and which has its other end operatively connected to a source of power (not shown) which may include a hydraulic, air or mechanical system. At the end of shaft 52 that is received through the support member 11a there is secured an eccentric 54. Pivotally connected to this eccentric is an extendible link designated generally by the reference numeral 56. The extendible link 56 is connected to the eccentric 54 by means of pin 58. A stud 60 is threadedly received in a nut 62, and an adjustor wheel 64 is operatively connected to stud 60, which has its other end received in a socket 66. The socket 66 is pivotally connected to one arm of each lever 30a by means of pivot pin 68.

In operation, operator applied effort exerted through an air, hydraulic or mechanical system turns shaft 52 counterclockwise, as indicated by the arrow in FIGURE 5. As the shaft turns the eccentric 54 causes link 56 to move downward, and through the pivotal connection 68 with the arms of levers 30a, the arms are forced downward rotating the levers 30a and spreading the shoes 32a outwardly into engagement with the drum 10a. In this embodiment as in the above described embodiment of my invention, each of the shoes will have equal effectiveness and both shoes will have the same effectiveness in either forward or reverse braking for a given input. This result is due to the relative location of the pivot points 28a, 40a and the center of the brake as explained in detail with reference to the first embodiment.

Although the invention has been described in connection with only a few selected embodiments, it will be apparent to those skilled in the art that the principles of my invention are susceptible of numerous applications with brakes other than those specifically shown. It is, therefore, my intention to include within the scope of the following claims all equivalent structure and arrangement of parts by which the same, or substantially the same, results can be accomplished.

I claim:

1. A brake comprising a fixed support member, a torque taking member rigidly secured to said support member near the lower end thereof, a pair of oppositely-located applying levers each pivotally mounted at its lower end to said torque taking member, actuating means interposed between the upper ends of said levers, and a pair of arcuate friction elements one pivotally secured to each of said applying levers, the pivot points of each of said friction elements and its respective lever being on a straight line forming substantially the radial right angle with a line interconnecting the friction element pivot point and the center of the brake.

2. For use in cooperation with a rotatable member, a brake comprising a nonrotatable support member, a pair of applying levers each pivotally mounted at one end on said support member, actuating means for spreading said levers interposed between the free ends of said levers, a friction element pivotally secured to each of said levers and engageable with said rotatable member when said levers are spread, the pivot connection of said friction element and lever, the pivot of said lever on said support member and the center of the brake being disposed in substantially right triangular relation so that the resultant force exerted on said friction element by said rotatable member upon frictional engagement therewith is substantially the same for a given applying effort in braking either direction of rotation of said rotatable member, and resilient means interconnecting said levers for retracting said levers and shoes upon release of the applying effort.

3. In a brake, a fixed supporting means, applying levers pivoted on said supporting means, two friction elements one actuated by each of said levers, means pivotally securing said friction elements to their respective levers and disposed radially from the center of said brake whereby the moment arms of the resultant forces acting on each friction element during forward braking and the resultant forces acting on said friction element during reverse braking pass through said mounting positions and form angles that are bisected by lines connecting said pivot points between said levers and said friction elements and the pivotal mounting points of said applying levers on said supporting means.

4. In a brake, a supporting member, a turnable shaft received through an opening in said support member, an extendible link eccentrically connected at one end to said shaft so that as said shaft turns said link will reciprocate, a pair of bell-crank levers pivotally mounted on said supporting member with one end of each adjacently located and pivotally connected to the other end of said link whereby turning of said shaft causes turning of said levers, and a pair of oppositely-located arcuate brake shoes pivotally mounted on the other ends of said levers, the pivot points of each of said shoes and said levers being located on a line perpendicular to a radial line passing through the pivot point of the shoe.

5. In a brake, a support plate, a pair of bell-crank levers fulcrumed on said support plate with the ends of one arm located adjacent one another, a pair of brake shoes one pivotally mounted on the other arm of each of said levers, the fulcrum of each lever and the pivot point of its associated shoe being located on the line perpendicular to a radial line passing through the shoe pivot, an extendible link pivotally secured to the adjacent ends of said levers, and actuating means for moving said link to turn said levers and thereby spread apart said shoes.

6. In a brake, a support member, a pair of levers pivoted on said member, and a pair of brake shoes one pivotally connected to each of said levers, the pivot points of said levers and shoes being located on a line that is perpendicular to a radial line passing through the shoe pivot point, and mechanical actuating means for pivoting said levers and applying said shoes.

7. In a brake, supporting means, anchoring means, applying means mounted for pivotal movement on said anchoring means, a radially applied friction element, and means forming a rigid pivotal connection between said applying means and friction element to transfer anchoring load of said friction element through said applying means to said anchoring means in each direction of braking by said friction element, said anchoring means and rigid pivotal connection being located relatively to each other to be on a line perpendicular to a radial line passing through the center of said brake and said pivotal connection.

8. In an internally-expanding brake having equal braking effectiveness in forward and reverse directions of braking, a support member, an applying means, anchoring means pivotally securing said applying means to said support member, a friction element, means pivotally securing said friction element to said applying means to provide transmittal of anchoring force through said applying means to said anchoring means in each direction of braking by said friction element, said anchoring means and means pivotally securing said friction element to said applying means being located along a line perpendicular to the radius bisecting the resultant forces on said friction element produced by the respective directions of movement during braking.

References Cited in the file of this patent

UNITED STATES PATENTS

| | | |
|---|---|---|
| Re. 22,586 | Spiller et al. | Jan. 2, 1945 |
| 1,619,718 | Girling | Mar. 1, 1927 |
| 1,967,414 | La Brie | July 24, 1934 |
| 2,140,778 | White | Dec. 20, 1938 |
| 2,287,261 | McColgan | June 23, 1942 |
| 2,337,070 | Alden et al. | Dec. 21, 1943 |
| 2,399,654 | Alden et al. | May 7, 1946 |
| 2,435,955 | Buckendale et al. | Feb. 17, 1948 |
| 2,862,580 | Burnett | Dec. 2, 1958 |

FOREIGN PATENTS

| | | |
|---|---|---|
| 861,737 | France | Nov. 4, 1940 |
| 626,064 | Germany | Feb. 20, 1936 |